United States Patent
Overesch

[11] 3,896,609
[45] July 29, 1975

[54] MOWING MACHINE

[75] Inventor: Albert Overesch, Rheine, Germany

[73] Assignee: Maschinenfabriken Bernard Krone GmbH, Spelle, Germany

[22] Filed: Oct. 26, 1973

[21] Appl. No.: 410,249

[52] U.S. Cl. .......................... 56/13.6; 56/1; 56/16.4
[51] Int. Cl. ............................................. A01d 35/26
[58] Field of Search ......... 56/1, DIG. 1, 14.3, 14.4, 56/41, 42, 13.6, 153, 13.3, 12.7, 16.4, 6, 341

[56] References Cited
UNITED STATES PATENTS

| | | | |
|---|---|---|---|
| 2,585,296 | 2/1952 | Bennett et al. | 56/12.7 X |
| 2,656,662 | 10/1953 | Hines | 56/12.7 |
| 3,241,300 | 3/1966 | Fell et al. | 56/153 |
| 3,641,754 | 2/1972 | Anstee | 56/341 |
| 3,699,755 | 10/1972 | Hauser | 56/16.4 |
| 3,716,972 | 2/1973 | Case et al. | 56/1 |
| 3,716,973 | 2/1973 | Kidd | 56/6 |
| 3,732,672 | 5/1973 | Adee et al. | 56/13.3 |
| 3,751,889 | 8/1973 | Overesch | 56/13.6 |

Primary Examiner—Russell R. Kinsey

[57] ABSTRACT

Mowing machine with at least two mowing devices arranged transversely to the direction of movement of the mowing machine and driven so as to rotate around generally vertical axes, the mowing devices being mounted on a common supporting beam. A posttreatment arrangement for the cut harvest is operatively connected to and behind the supporting beam relative to the direction of movement of the mowing machine. Each of the mowing devices is also supported on the ground by a supporting dish. The posttreatment arrangement comprises a substantially horizontal drive shaft to which there are freely pivotally connected a plurality of flailing clubs, the outer ends of which describe a circumference. A fender is mounted in the arrangement at a short distance from said circumference. The flailing clubs move about the drive shaft in a direction opposite to that of the mowing machine and below the drive shaft in a direction parallel to the movement of the mowing machine.

16 Claims, 4 Drawing Figures

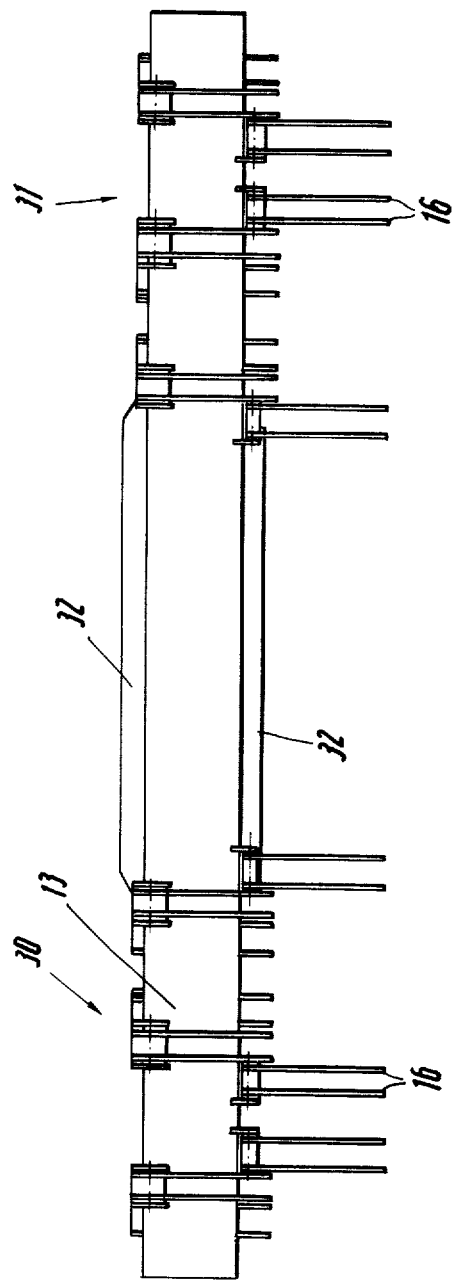

MOWING MACHINE

The invention relates to mowing machines having at least two mowing devices which are transversely arranged one adjacent to the other relative to the movement of the mowing machine. These mowing devices are driven so as to rotate around generally vertical axes and are mounted on a common supporting beam. The mowing machine further comprises a post-treatment arrangement which includes a substantially horizontally extending drive shaft which is operatively connected to the driving means for the mowing devices. A plurality of flailing clubs are pivotally connected on a drive shaft.

A known machine of this type is for example disclosed in applicant's co-assigned U.S. Pat. No. 3,751,889. The known machines of this type comprise a post-treatment arrangement which has two horizontally arranged rollers forming a crushing device, said rollers being adapted to crush the cut harvest. This known arrangement can only operate properly if the cut harvest traverses the guides between the two crushing rollers in the form of a relatively thin layer. If the character of the cut harvest fluctuates substantially there occur irregularities in the post-treatment which requires the crushing roller to separate from each other when a densely packed harvest is cut. The profile of the crushing rollers is adapted for a certain type of crushing and bending operation of the cut harvest which is not at all times suitable for the type of harvest that is being cut. The aforedescribed known crushing device is costly, heavy and cumbersome, and the post-treated harvest is delivered in a relatively compact crushed mass from the crushing gap between the crushing rollers.

SUMMARY OF THE INVENTION

It is an object of this invention to provide a mowing machine of simple and inexpensive construction which operates reliably and includes a post-treatment arrangement which receives the cut harvest from the mowing devices and effectively delivers it onto a loosely arranged rake which carries out a rapid drying so that the cut harvest can be easily further treated.

The mowing machine of the present invention distinguishes itself from the aforedescribed prior art mowing machine in particular with respect to the post-treatment arrangement. In the post-treatment arrangement of the mowing machine of the present invention there is provided one horizontal drive shaft on which there are freely pivotally mounted a plurality of flailing clubs or mallets, the outer ends of which describe a circumference when the drive shaft is rotating. A fender is mounted at a short distance from the aforesaid circumference which covers also the drive mechanism for the horizontal drive shaft. The flailing clubs or mallets rotate above the drive shaft in a direction opposite to that of the movement of the mowing machine and below the drive shaft in the same direction as the movement of the mowing machine. This new arrangement provides for a secure reception and seeding of the cut harvest, as well as an effective treatment of the cut harvest in the operative region of the flailing clubs or mallets and the loose delivery of the post-treated cut harvest which is thrown rearwardly via an overhead movement.

The fender which covers at least partially the operative circumference of the outer ends of the flailing mallets or hammers has a transverse edge, preferably arranged forwardly relative to the rotary direction of the flailing hammers. This transverse edge is situated at a smaller distance from the operative circle of the outer ends of the flailing hammers than the rearward edge of this same fender. This arrangement provides for a type of treatment and feeding channels which widen as it extends rearwardly from the mowing devices. Thereby a loosening of the compacted cut harvest is carried out while simultaneously the forward transverse edge of the fender, which is situated closer to the operative circle of the flailing mallets and hammers, serves to some extent as a supporting surface for carrying out a bending operation in the cut harvest. The fender can furthermore be provided with guiding members which extend into the transportation gap between pairs of mowing devices obliquely upwardly relative to the supporting beam, which provide a reliable transfer of the cut harvest even when a large volume is cut by the mowing devices and fed to the gap between the mowing devices into the operative region of the flailing clubs. This is significant with mowing machines having only one pair of mowing devices as well as those mowing machines having two or more pairs of mowing devices. The horizontal drive shaft is preferably vertically adjustable so that the post-treatment arrangement can be adapted to the cutting level of the mowing devices in accordance with a further feature of this invention.

The flailing mallets, clubs or hammers can be arranged in groups on the horizontal drive shaft, so that there is always one group disposed in the region of the transportation gap between pairs of mowing devices coacting with each other while in the region of the mowing devices itself no flailing clubs, mallets or hammers are mounted on the horizontal drive shaft. The drive shaft can be provided in the region between groups of flailing hammers, mallets or clubs with beating arms. There are preferably arranged two diametrically opposite beating arms on the horizontal drive shaft, which prevents the winding of the cut harvest around the horizontal drive shaft.

The flailing clubs, mallets or hammers can be made from simple sheet iron, whereby two flailing members coact as a flailing pair to improve the bending effect produced in the cut harvest. The peripheral velocity of the outer ends of the flailing members when the mowing machine is in operation amounts to 15 to 30 meters per second and can be adjusted in accordance with the type of harvest that is being cut.

The bending effect which is carried out by the flailing members can be reinforced in accordance with a further feature of this invention, by providing a bending rake above the horizontal drive shaft and the distance from the operative circle of the flailing members. This bending rake has bending fingers extending downwardly into the operative circle of the flailing members and between the individual flailing mallets, hammers or clubs. These bending fingers can in their simplest form be made of simple round rods and be bent rearwardly to favor the sliding through of the cut harvest. The bending rake is preferably arranged above and in the forward region of the fender and extends through slits or openings in the fender with its bending fingers. The points of the bending fingers of the bending rake, and specifically the extent of their penetration into the fender, can be adjusted — either vertically or pivotally — to adjust the bending effect and preparation of the cut harvest. Consequently, the bending rake can be adapted to different types of harvests.

A hay hood can be connected behind the post-treatment arrangement, said hood being vertically adjustable and mounted on the supporting structure for the post-treatment arrangement above the fender thereof. Such a hood favors the formation of a single loosely coherent pile in particular with hay mowing machines having a plurality of pairs of coacting mowing devices.

The post-treatment arrangement can be mounted on the main supporting frame of the mowing machine. This main frame is advantageously connected to the three point hydraulic support structure of a tractor. This constructional arrangement is also possible with a mowing machine having a supporting beam which forms jointly with the mowing devices a trailer which is supported on the ground by means of supporting wheels and a supporting frame. In such an arrangement the supporting beam is connected by a parallel linkage to the tractor and is adjustable vertically by being pivotally connected in a transverse direction to the tractor. In such an arrangement the hay hood or bonnet is advantageously mounted on the main supporting frame in order to reduce the weight on the supporting structure which must be vertically adjusted to adapt it to the contours of the ground over which the mowing machine moves.

BRIEF DESCRIPTION OF THE DRAWING

The invention will be described in further detail in the following description taken in conjunction with the appended drawing in which:

FIG. 4 is a top plan view of a horizontal drive shaft illustrating the manner in which the groups of flailing members are arranged in a mowing machine having a pair of mowing devices.

DETAILED DESCRIPTION

Figure 1:
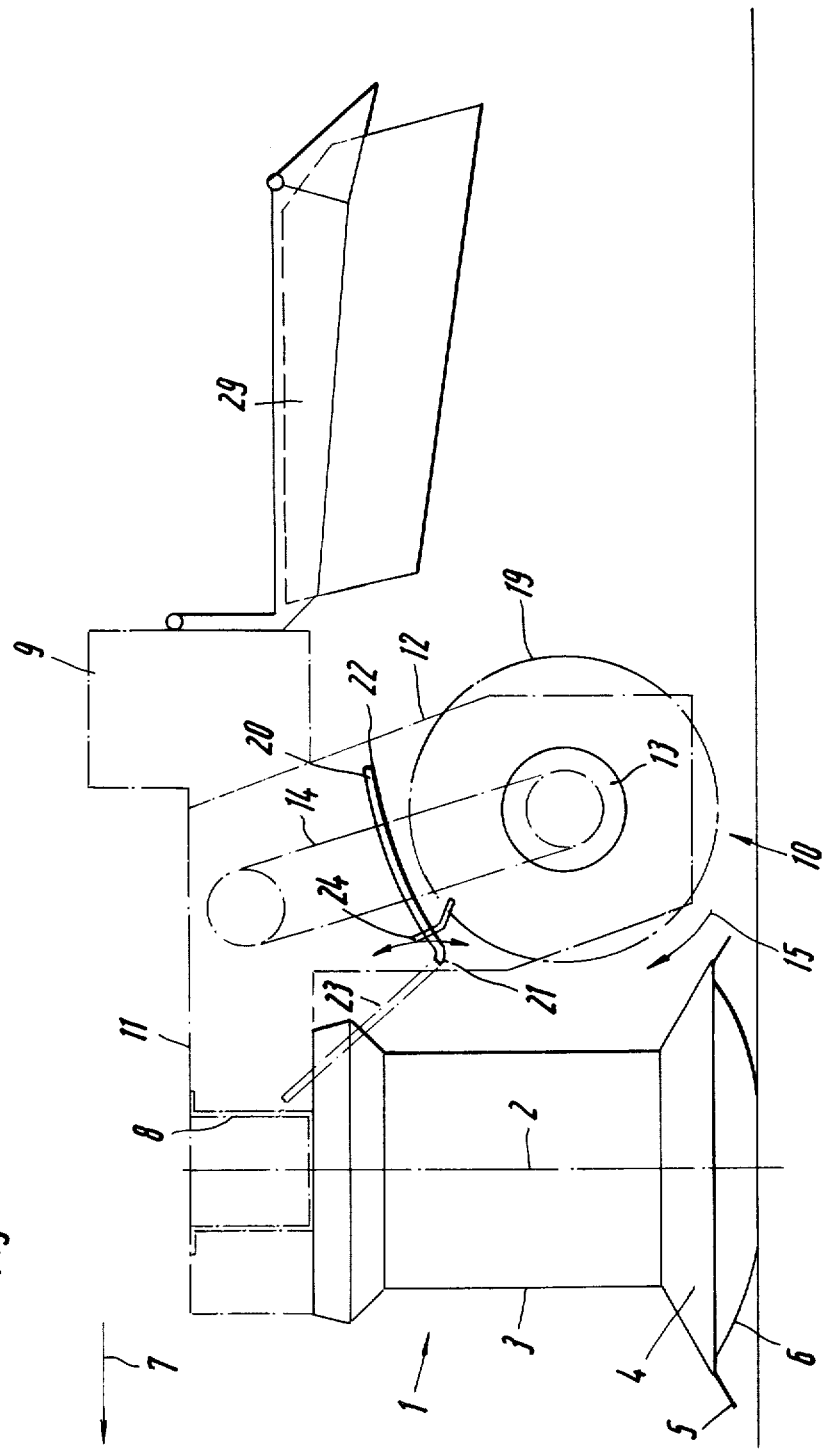
FIG. 1 is a schematic side elevational view of a mowing machine in accordance with this invention.

The mowing machine illustrated in the drawing includes a plurality of individual mowing devices 1 arranged in pairs, for example two or four mowing devices are arranged in pairs in one mowing machine. The mowing devices are rotatable about vertical axes 2 and include the drum bodies 3 having conical ring collars 4 on which cutting knives 5 are pivotally mounted. A freely rotatable supporting dish 6 is mounted underneath each drum body 3. The mowing devices are arranged transversely relative to the moving direction 7 of the mowing machine one next to the other on a supporting beam 8. A drive shaft (not illustrated) extends to the supporting beam 8 and is operatively connected to the driving mechanisms for the individual mowing devices 1. It is however also possible to operatively connect the supporting beam 8 by means of conventional gear mechanisms to the three-point hydraulic driving means of an agricultural tractor. Lastly, it is possible to incorporate the supporting beam 8 into the suspension frame of a wheel carriage which is indicated schematically with the reference number 9 and which is supported on the ground by means of non-illustrated wheels. The supporting beam 8 can also be connected by means of a pivotal connection to a parallelepiped frame which extends transversely to the direction of movement 7 and which is vertically adjustable. This last described construction is particularly advantageous in combination with the mowing machine in accordance with this invention. In all of the aforedescribed constructional arrangements the drive for the mowing devices is carried out via a tapered gear wheel, intermediate gear drive, and a conventional pull-drive mechanism. The post-treatment arrangement generally designated with the reference number 10 is arranged behind each pair of oppositely rotating mowing devices 1. The post-treatment arrangement includes a housing 11 having side supporting walls 12. The horizontal drive shaft 13 is rotatably as well as vertically adjustably supported in the side walls 12. This drive shaft 13 is preferably of unitary construction. The drive shaft 13 is rotated by means of the conventional intermediate drive mechanism 14 for rotation in the direction of the arrow 15. The driving mechanism 14 is connected to the non-illustrated conventional driving mechanism for the mowing devices 1.

Figure 2:
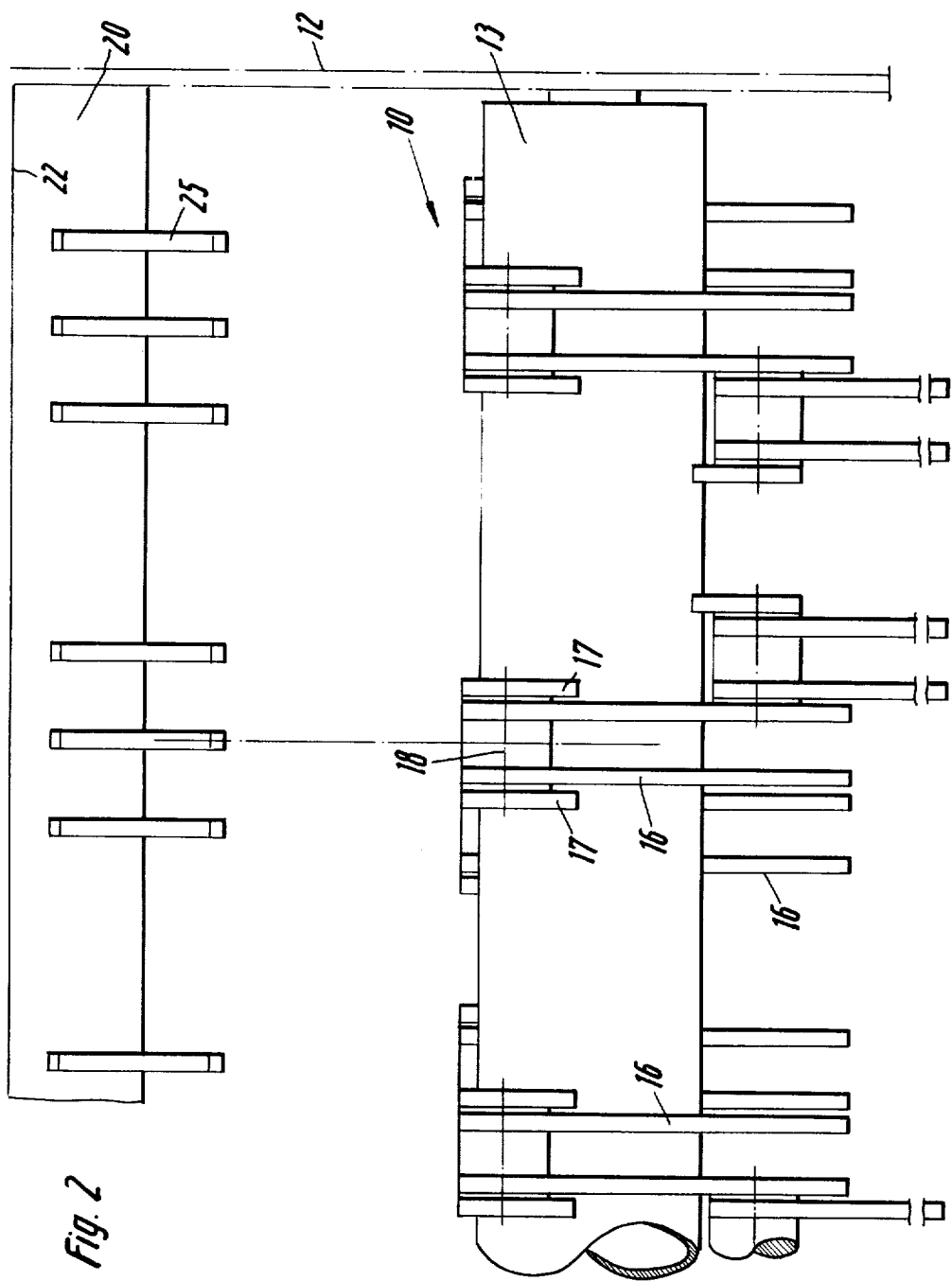
FIG. 2 is a partial enlarged side view of the post-treatment arrangement, wherein the horizontal drive shaft with its flailing members, the fender as well as the bending rake are illustrated in detail.
Figure 3:
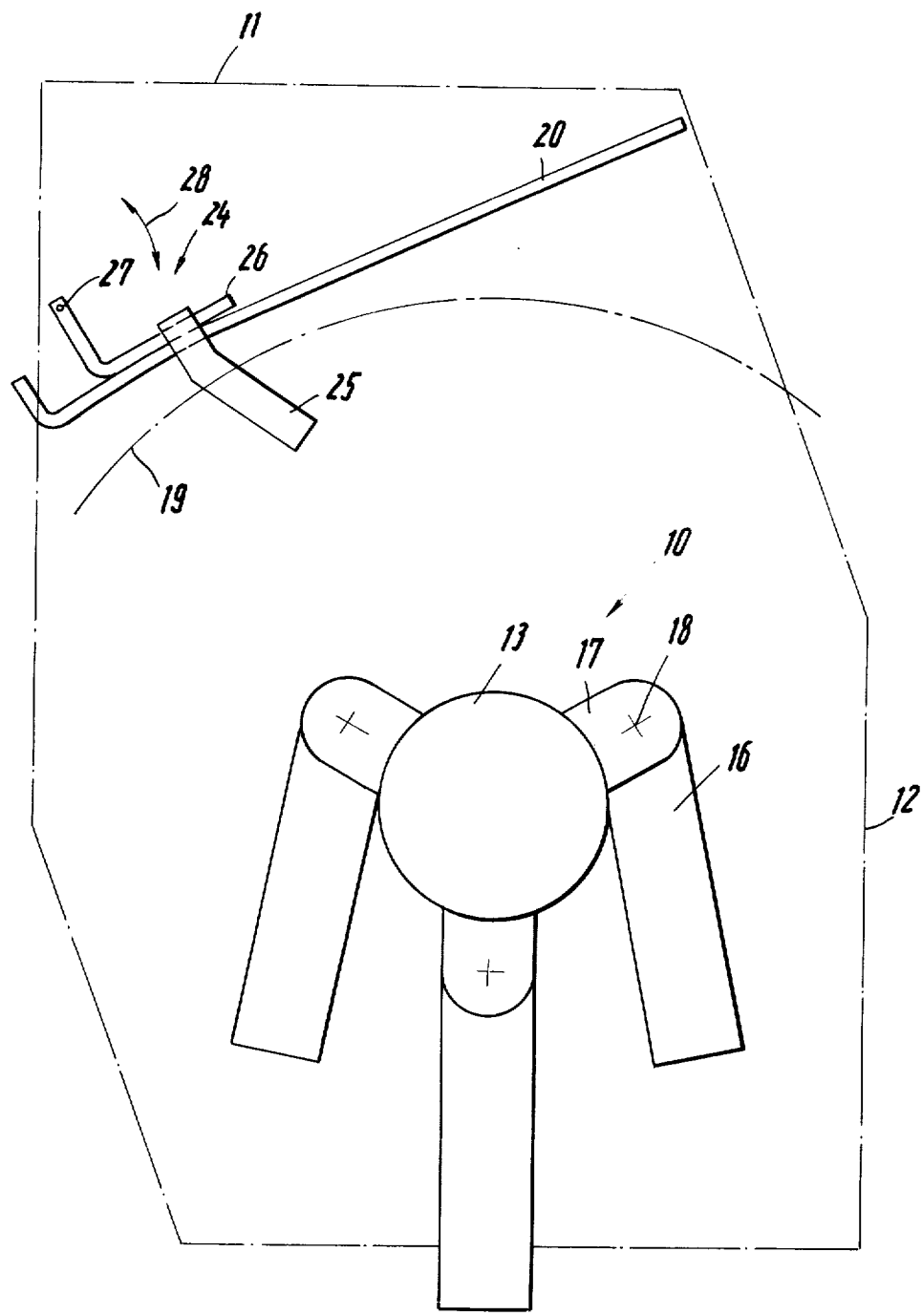
FIG. 3 is an enlarged end view of the arrangement shown in FIG. 2 when the post-treatment arrangement is not in operation.

As can be noted from FIGS. 2 to 4, the drive shaft 13 includes a plurality of flailing members 16, which are freely pivotally mounted at 18. The flailing members 16 consist of flat sheet iron. The members 16 are furthermore arranged in pairs and are pivotally connected to the clips 17 which in turn are welded to the drive shaft 13, so that the members 16 are freely pivotable about the support 18. In accordance with the embodiment of FIGS. 2 and 3, three pairs of flailing members are arranged at a distance of 120° from each other around the drive shaft and are closely axially spaced. The next combination of three pairs of flailing members is arranged on the drive shaft 13 at a predetermined axial distance from the first group of pairs of flailing members. However, any other suitable arrangement of flailing members can also be used in the arrangement of the invention.

The flailing members carry out a circumferential movement so that the outer ends thereof describe a maximum circumference. The direction of movement of the flailing members 16 below the drive shaft 13 are parallel to the moving direction 7, whereas the direction of movement of the flailing members above the drive shaft 13 is opposite to the moving direction 7. The maximum circumference described by the outer ends of the flailing members 16 is designated with the reference number 19. A fender 20 is mounted between the side walls 12 at a distance from the circumference 19 and includes a leading transverse edge 21, relative to the rotary direction of the flailing member 16 above the drive shaft 13. The fender also has a trailing edge 22. The leading edge 21 is closer spaced to the circumference 19 than the trailing edge 22. The fender 20 has furthermore a guide member 23 which extends obliquely upwardly in the region of the feeding gap which is defined between pairs of coacting mowing devices. Thus with a mowing machine having two drums or mowing devices the fender 20 has only one guide member 23 extending therebetween, whereas with a four-drum — six-drum arrangement there are respectively two or three guide members 23 extending between coacting mowing devices.

There is also provided a bending rake, generally designated with the reference numeral 1, which is pivotally supported between the side walls 12 and extends to the fender 20 into the region of the circumference 19. The bending rake 24 has downwardly extending bending fingers 25 which extend into the operative region of the circumference 19 between the flailing members 16. These bending fingers 25 may consist of flat sheet metal or rods. As can be noted from FIGS. 1 and 3 the fingers 25 extend rearwardly through suitable openings or slits in the fender 20. The bending fingers 25 are supported on a common supporting member 26 which is pivotable about a support axis 27 so that it can be moved in the direction of the arrow 28. This vertical and pivotal adjustability makes it possible to adjust the degree of overlap between the flailing members 16 and the bending fingers 25, so that the extent of bending of the mowed harvest can be adjusted in accordance with the type of harvest. When the flailing members 16 are arranged in pairs there is at all times provided one bending finger 25 for one pair of flailing members, as can be noted from FIG. 2. Thus the bending fingers 25 extend between flailing member 16 as the latter rotates about the axis of the horizontal drive shaft.

A hood 29 is mounted behind the post-treatment arrangement 10 at a level above the fender 20. This hood 29 serves to distribute the mowed and prepared harvest in a loose yet sharply defined heap behind the mowing machine as the latter progresses over the ground. This hood 29 is vertically adjustable mounted on the machine frame 9. The width of this can also be adjusted by conventional means, which has not been illustrated in detail. In those mowing machines which are arranged on the frame, which is pulled by a tractor, the hood 29 is directly mounted on the post-treatment arrangement.

The post-treatment arrangement can have a construction which is completely separate from the supporting beam 8 so that the post-treatment arrangement can be selectively disconnected from the supporting beam 8. Alternately the post-treatment arrangement 10 can be rigidly connected to the supporting beam 8 as, for example, by welding.

In particular with mowing machines having four mowing devices, arranged in pairs of oppositely rotating and coacting mowing devices, the horizontal drive shaft 13 is preferably provided with flailing members 16 arranged in groups, as can be clearly noted from FIG. 4, wherein the left group of flailing members is designated with the reference number 30 and the right group is designated with the reference number 31. However, the flailing members 16 can also be arranged in this way when there is only a single pair of mowing devices 1 in the mowing machine. The groups of flailing members are arranged on the drive shaft 13 relative to the pair of mowing devices so that they extend and are symmetrically arranged about the plane dividing the gap defined by the pair of drums 3 of a pair of coacting mowing devices 1. The total width occupied by a group of flailing members on the shaft 13 exceeds the width of the feeding gap, so that all of the mowed harvest exiting from the feeding gap between the drums 3 is grasped and processed by the flailing members 16. In order to avoid a clogging by mowed harvest material in the space between adjacent groups of flailing members, there is provided on the drive shaft 13 in these spaces, beating arms 32 which prevent the winding of the mowed harvest material around the drive shaft 13 in the aforementioned region. Preferably these beating arms can be formed by a pair of diametrically oppositely mounted plates 32. When the mowing machine is in operation, the mowed harvest material is bent and beaten immediately behind the mowing devices. The mowed harvest material is thrown rearwardly in an overhead movement. The peripheral velocity of the outer ends of the flailing members amounts to approximately 15–30 m/sec and can be adjusted according to the type of mowed harvest material and the desired type and intensity of preparation and processing of the mowed harvest material.

Although the invention is illustrated and described with reference to one preferred embodiment, it is to be expressly understood that it is in no way limited to the disclosure of such a preferred embodiment, but is capable of numerous modifications within the scope of the appended claims.

What is claimed is:

1. A mowing machine adapted to move over the ground, comprising in combination,
   a machine frame;
   a supporting beam mounted on said machine frame;
   at least two mowing devices operatively mounted on said supporting beam in coacting pairs which are adapted to rotate around general vertical axes in mutually opposite directions; said mowing devices being arranged on said supporting beam transversely relative to the direction of movement of said mowing machine and define feed gaps therebetween;
   a post-treatment arrangement for the harvest material which has been cut by said mowing devices is operatively connected behind said supporting beam relative to the direction of movement of said mowing machine;
   said post-treatment arrangement comprises a substantially horizontal drive shaft rotatably mounted on said machine frame substantially parallel to said supporting beam;
   a plurality of flailing members freely pivotally connected to said drive shaft, so that the outer ends thereof describe a maximum operative circumference; and
   a fender mounted on said machine frame at a predetermined distance from said drive shaft and extending substantially parallel thereto; said flailing members being adapted to move immediately above said horizontal drive shaft in a direction generally opposite to the direction of movement of said mowing machine and below said horizontal drive shaft in generally the same direction as said mowing machine; said plurality of flailing members are arranged in groups on said drive shaft, so that one group of flailing members is mounted opposite said feed gap between a pair of coacting mowing devices.

2. The mowing machine as set forth in claim 1, wherein said fender has a transverse forward edge and transverse rear edge relative to the direction of movement of the mowing machine, said forward edge is at a smaller distance than said rearward edge from said circumference.

3. The mowing machine as set forth in claim 2, wherein said fender furthermore has at least one guide member which extends obliquely upwardly between a coacting pair of mowing devices.

4. The mowing machine as set forth in claim 1, wherein the horizontal drive shaft has mounted thereon beating plates between adjacent groups of flailing members.

5. The mowing machine as set forth in claim 4, wherein the beating plates are arranged diametrically opposite from each other on the drive shaft.

6. The mowing machine as set forth in claim 5, wherein the flailing members are made of flat iron pieces.

7. The mowing machine as set forth in claim 6, wherein the flailing members are pivotally mounted on the drive shaft as coacting pairs.

8. The mowing machine as set forth in claim 7, wherein the peripheral velocity of the flailing members is 15 to 30 m/sec.

9. The mowing machine according to claim 8, including a bending rake mounted above said circumference in said post-treatment arrangement, said bending rake including a plurality of bending fingers which extend into the region defined by said maximum circumference of said flailing members.

10. The mowing machine as set forth in claim 9, wherein said bending fingers of said bending rake are made out of round rods.

11. The mowing machine as set forth in claim 10, wherein said bending fingers include a portion which extends angularly rearwardly relative to the moving direction of said mowing machine.

12. The mowing machine according to claim 11, wherein there is provided one bending finger for each pair of coacting flailing members, said bending finger extends between the coacting rotating flailing members.

13. The mowing machine as set forth in claim 12, wherein said bending rake is mounted above said fender and the bending fingers thereof extend through slits on said fender.

14. The mowing machine as set forth in claim 13, wherein said bending rake is vertically adjustably and pivotally mounted in said post-treatment arrangement.

15. The mowing machine according to claim 14, including driving means for said mowing devices and said horizontal drive shaft said driving means being operatively connected to each other.

16. The mowing machine as forth in claim 15, including a hay hood operatively connected to said post-treatment arrangement.

* * * * *